United States Patent [19]

Kitano et al.

[11] Patent Number: 4,817,427
[45] Date of Patent: Apr. 4, 1989

[54] DEVICE FOR MEASURING WATER FLOW RATE IN PLANT STEM
[75] Inventors: Masaharu Kitano, Koga; Hiromi Eguchi, Fukuoka, both of Japan
[73] Assignee: Kyushu University, Fukuoka, Japan
[21] Appl. No.: 196,508
[22] Filed: May 20, 1988
[30] Foreign Application Priority Data Sep. 19, 1987 [JP] Japan ................. 62-233636

[51] Int. Cl.⁴ .............................. G01F 1/68
[52] U.S. Cl. ..................... 73/204.16; 47/1 R
[58] Field of Search ............ 73/204; 47/1 R
[56] References Cited

U.S. PATENT DOCUMENTS 4,339,949  7/1982  Bahner et al. ................. 73/204
4,745,805  5/1988  Granier ........................ 73/204

Primary Examiner—Herbert Goldstein
Attorney, Agent, or Firm—Spencer & Frank

[57] ABSTRACT

The disclosed device includes a heater mounted on a plant stem for generating a heat flow Q so as to give a heat supply $(Q-Q_o)$ to water flow in the stem, $Q_o$ being heat loss, a means for controlling heat loss $Q_o$ or heat dissipation through surfaces of the heater and the plant stem at a constant level, a means for measuring difference of the stem temperature between the upstream and downstream ends of the heater, and a means for determining the water flow rate in the plant stem from the above temperature difference and the input power to the heater.

4 Claims, 5 Drawing Sheets

FIG_1
FIG_2
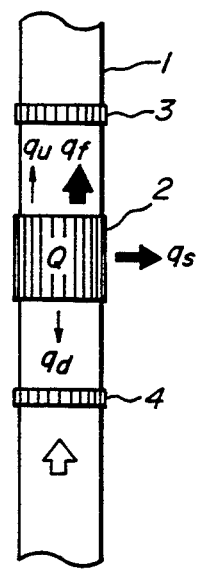
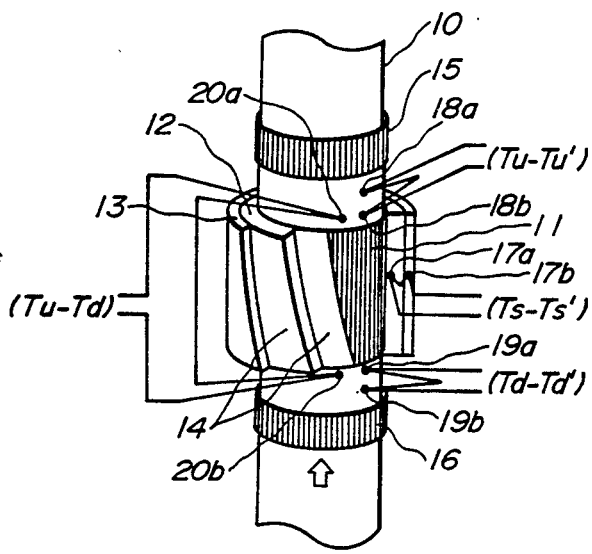

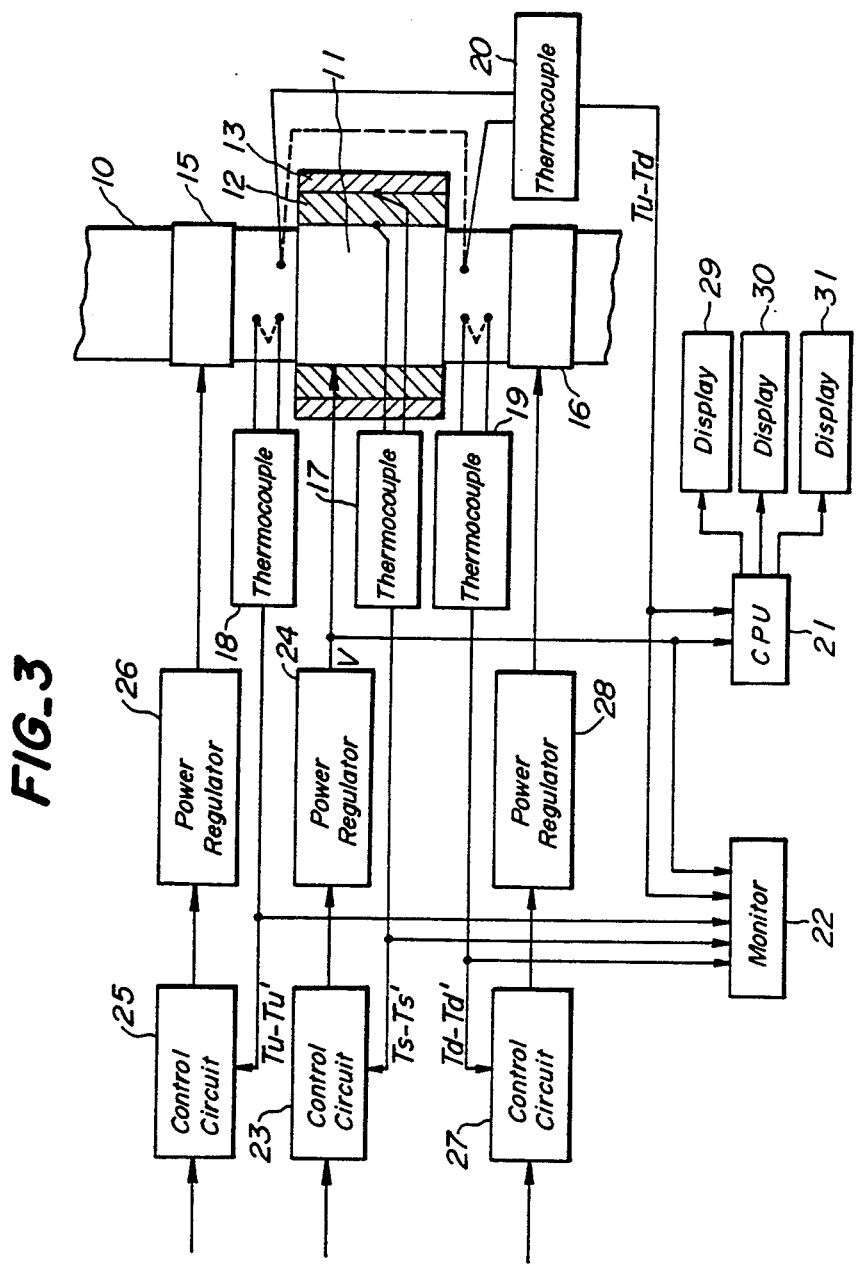
FIG._3

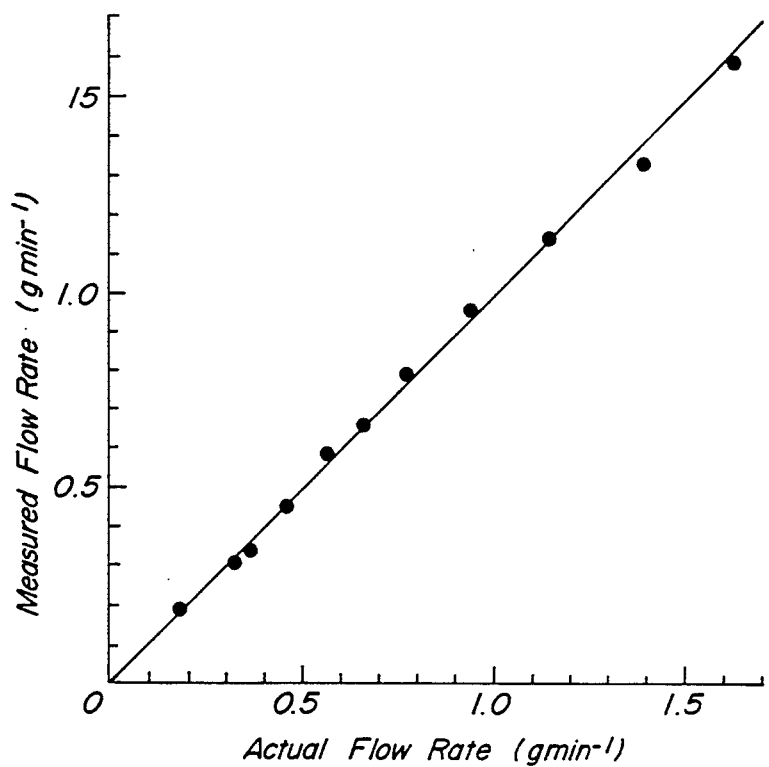
FIG_4

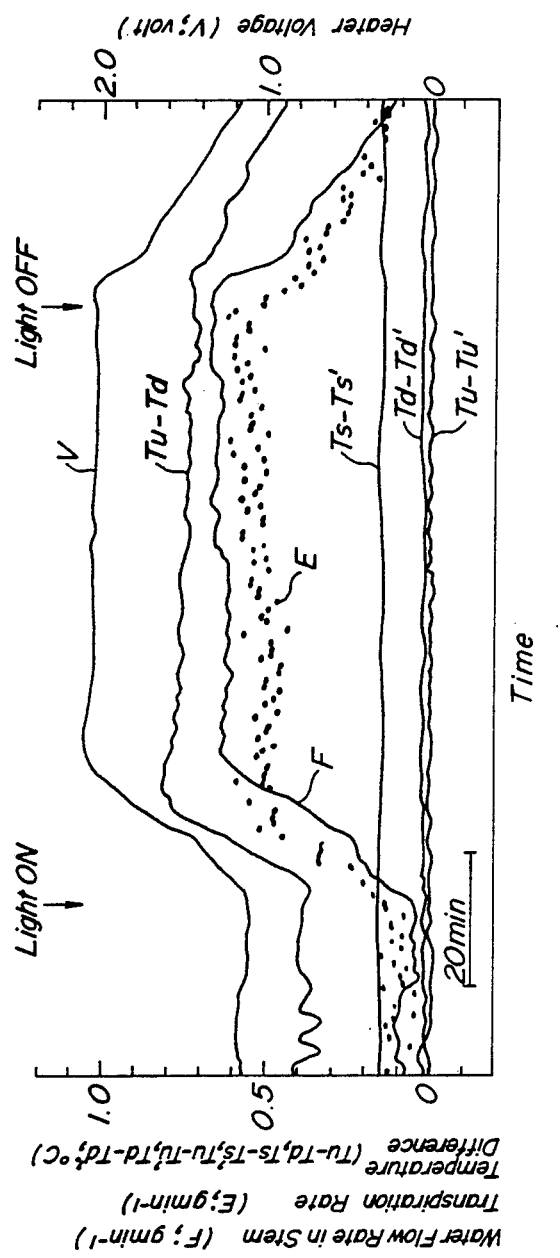
FIG._5

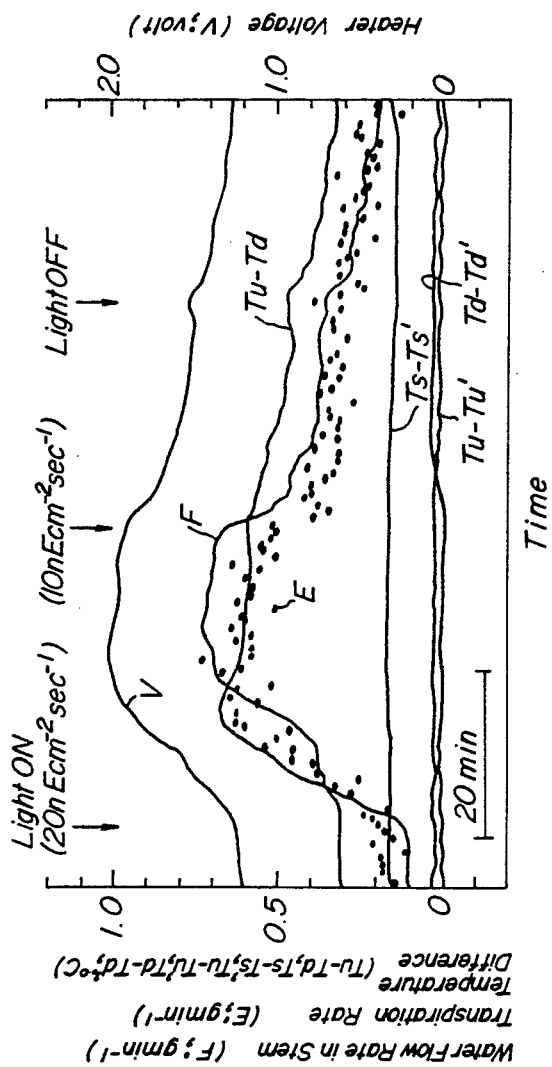
FIG_6

DEVICE FOR MEASURING WATER FLOW RATE IN PLANT STEM

BACKGROUND OF THE INVENTION

1. Field of the Invention

This invention relates to a device for measuring water flow rate in plant stem. More particularly, the invention relates to a device for measuring water flow rate in the stem of a plant in an on-line real time fashion.

2. Related Art Statement

In the field of growing plants in green houses or the like facilities, it is desirable to effect reasonable water control, automatic irrigation and monitoring of plant conditions. To this end, accurate quantitative knowledge is necessary on the water flow rate in the plant stem. The stem water flow represents water absorption by roots for compensation of the transpiration at leaves. Accordingly, there is a pressing need for development of a device for measuring the water flow rate in plant stem on the basis of on-line real time operation.

Heretofore, a heat pulse method is known for measuring the water flow rate in the plant stem, for instance as disclosed in the Journal of Botanical Society of Federal Republic of Germany, issued in 1937, volume 55, pages 514–529. This known method measures the propagation velocity of heat pulses in a plant stem, and it is useful in evaluating relative strength of water flow in the plant stem.

Another known approach to the measuring of water flow rate in the plant stem is a stem heat balance method which is disclosed for instance in the Journal of Institute of Agricultural Meteorology, issued in 1981, volume 37, pages 9–17. In this known method, a certain quantity of heat is continuously applied to a portion of plant stem, and the water flow rate in the plant stem is determined based on the heat balance in response to such heat application. With this stem heat balance method, the absolute value of the water flow rate in plant stem can be directly measured.

However, the heat pulse method has a shortcoming in that, although being effective in evaluating relative intensity of water flow in plant stem, it cannot measure the absolute value of the water flow in plant stem.

Further, continuous measurement is not possible with it. Thus, the heat pulse method is not suitable for quantitative analysis of the water flow in plant stem.

The stem heat balance method has a shortcoming in that, although it can measure the absolute value of water flow rate in plant stem, its process for measurement and calculation is complicated because accurate measurements are required on a number of ever changing items of the heat balance. Further, each item of the heat balance can be determined only by cutting the plant stem for additional measurement, so that this method is not suitable for on-line real time data processing of the water flow rate in plant stem.

SUMMARY OF THE INVENTION

Therefore, an object of the present invention is to solve the above-mentioned shortcomings of the prior art by providing an improved device for measuring water flow rate in plant stem. The device of the invention is simple in structure, yet it facilitates the measurement of water flow rate in plant stem in an on-line real time fashion.

A device for measuring water flow rate in plant stem according to the invention comprises a heater which is mounted on a stem of plant so as to apply heat flow Q to the stem, a first control means for controlling the heat dissipation from outer surface of the heater at a certain level, a second control means for controlling the heat dissipation through the stem at a certain value, a detector for detecting the quantity of heat Q which is generated by the heater, and a temperature detecting means for measuring the temperature difference of the stem between two points which points engage upstream end and downstream end of the heater with respect to water flow in the stem respectively, whereby a calculating means determines the water flow rate F in the stem based on the detected quantity of heat Q and the detected temperature difference.

BRIEF DESCRIPTION OF THE DRAWINGS

For a better understanding of the invention, reference is made to the accompanying drawings, in which:

FIG. 1 is a diagrammatic illustration of the principles of a device of the invention for measuring water flow rate in the stem of plant;

FIG. 2 is a schematic perspective view of the manner in which sensor of the device of the invention are mounted on a plant stem;

FIG. 3 is a block diagram of an embodiment of the control circuit of the device of the invention;

FIG. 4 is a graph showing a comparison of measured values of water flow rate as determined by the device of the invention against the actual values of the water flow rate; and FIG. 5 and FIG. 6 are graphs showing the result of measurement of water flow rate in the stem of cucumber plant under different illuminating conditions respectively.

Throughout different views of the drawings, the following symbols are used.

| | |
|---|---|
| 1,10: stems, | 2: a heat source, |
| 3,4,15,16: sub-heaters, | 11: a main heater, |
| 12: plastic tape, | 13: heat-insulating layer, |
| 14: copper foil, | |
| 17,18,19,10: T-type thermocouples, | |
| 17a,17b,18a,18b,19a,19b,20a,20b: sensors, | |
| 21: a CPU (central processing unit), | |
| 22: a monitor unit, | 23,25,27: control circuits, |
| 24,26,28: power regulators, | 29: a display, |
| 30: a printer, and | 31: a memory. |

DESCRIPTION OF THE PREFERRED EMBODIMENT

Before entering into a practical example, the principles of the device for measuring water flow rate in plant stem according to the invention will be described by referring to FIG. 1. When a heat source 2 is mounted on a stem 1 of plant whose water flow rate is to be measured, heat flux emanate from the heater. The heat source 2 is assumed to have a certain width and surround the periphery of the stem 1 in a closed loop fashion. Heat flow Q (W) is continuously applied from the heat source 2 to the stem 1, and the heat flow Q is dissipated as the following four kinds of heat flux.

$q_f$(W): heat flux to be carried by water flow in the stem
$q_s$(W): heat flux to be dissipated from the outer surface of the heat source
$q_u$ (W): heat flux to be dissipated upwards through the stem by heat conduction $q_d$ (W): heat flux to be dissipated downwards through the stem by heat conduction The heat flux through the stem by heat conduction means the entire heat flow through the stem minus the heat flow carried by the water in the stem. Thus, heat balance is given by $$Q = q_f + q_s + q_u + q_d \quad (1)$$

The heat flux $q_f$ is directly proportional to the water flow rate in the stem, and it can be expressed by the following equation.

$$q_f = (F/k)C_w(T_u - T_d) \quad (2)$$

here,

F (gr/min): water flow rate in the stem $C_w$ (joule/gr°C.): specific heat of water flowing the stem $T_u$ (°C.): temperature of the stem at the downstream end (farther from the root of the plant) of the heat source $T_d$ (°C.): temperature of the stem at the upstream end (closer to the root of the plant) of the heat source k: constant, which may set a value of 60

Substitution of the equation (2) to the equation (1), the water flow rate F can indicate the following formula.

$$F = \frac{k\{Q - (q_s + q_u + q_d)\}}{C_w(T_u - T_d)} \quad (3)$$

If the heat source 2 is an electric heater with a small heat capacity, the heat flow Q is given by the following formula (4).

$$Q = V^2/R \quad (4)$$

here,

R(Ω): electric resistance of the heater

V(volt): voltage applied to the heater

On the other hand, the magnitudes of the heat flux $g_s$, $q_u$ and $q_d$ vary with the water flow rate in the stem, so that it is theoretically and technically impossible to detect each of them on an on-line real time basis. Thus, it is an important feature of the invention that the magnitudes of the heat flux $q_s$, $q_u$ and $q_d$ are not measured individually but they are controlled so as to keep the sum $Q_o$ of $q_s$, $q_u$, $q_d$ at a constant level, i.e., $q_s + q_u + q_d = Q_o = $ Constant, irrespective of the water flow rate F in the stem. As long as $Q_o = $ constant is maintained, the equation (1) is simplified to $Q = q_f + Q_o$, and the variation of the heat quality Q generated from the heat source 2 becomes the same as the variation of the heat flux $g_f$. Accordingly, as can be seen from the equation (3), the water flow rate F in the stem is determined by the hat quantity Q and the temperature difference $(T_u - T_d)$, and the water flow rate F in the stem can be measured by measuring both the heat quantity Q and the temperature difference $(T_u - T_d)$.

Each of the heat flux $q_s$, $q_u$ and $q_d$ is proportional to the temperature difference across two points on the propagation path of the specific heat flux. For instance, the upward heat flux $q_u$ is directed upwards along the stem 1, and it is proportional to the temperature difference $T_u - T_u'$ over two vertically spaced points at a stem portion downstream of the heat source 2; while the downward heat flux $q_d$ is directed downwards along the stem 1, and it is proportional to the temperature difference $T_d - T_d'$ over two vertically spaced points at a stem portion upstream of the heat source 2. The radial heat flux $q_s$ is directed radially outwards from the outer surface of the heat source 2, and it is proportional to the temperature difference $T_s - T_s'$ over two radially spaced points in a heat-transmitting member mounted on the outer surface of the heat source 2.

Thus, to keep $Q_o(=q_s + Q_u + q_d)$ constant, it is sufficient to maintain the above temperature differences $(T_s - T_s')$, $(T_u - T_u')$ and $(T_d - T_d')$ over the corresponding two points on the heat path constant, respectively. When the heat supply from the heat source 2 is so regulated depending on the water flow rate F in the stem as to maintain the above three kinds of the heat flux constant, it is not possible to maintain all of the above three kinds of the heat flux constant by controlling the heat supply from only one heat source, i.e., the heat source 2. For instance, when the water flow rate F in the stem is changed, if the heat supply from the heat source 2 is controlled so as to maintain the radial heat flux $q_s$ from the outer surface of the heater source 2 constant, the other two kinds of heater flux, i.e., the upward heat flux $q_u$ and the downward heat flux $q_d$ cannot be kept constant.

To solve this problem, the invention uses sub-heaters 3 and 4 at the downstream side and the upstream side of the heat source 2 with respect to the direction of the water flow in the stem as shown in FIG. 1. The temperature differences $T_u - T_u'$ and $T_d - T_d'$ are kept constant by regulating the heat supply from the sub-heaters 4 and 3 respectively.

To set a constant level for the above-mentioned sum of heat quantity $Q_o$, it is a simple but very accurate approach to use the value of the above-mentioned heat flow Q when the water flow rate F in the stem is zero, i.e., $q_f = 0$, as the constant level $Q_o$. When F=0, the equation (1) gives $Q_o = q_s + q_u + q_d$. Thus, after target levels of the temperature differences are preset for each of the heat flux dissipation directions, if the heat source 2 and the sub-heaters 3 and 4 are regulated so as to keep each of the said temperature differences at the corresponding preset level under the conditions of F=0, and if the heat generation Q from the heat source 2 is measured, then $Q = Q_o$ is given. In short, the measured value of Q when F=0 can be used as the set value for the heat flux sum $Q_o$. With the set value $Q_o$, the equation (3) can be simplified as follows.

$$F = \frac{k(Q - Q_o)}{C_w(T_u - T_d)} \quad (5)$$

In the equation (5), since the quantities $Q_o$, k and $C_w$ are known, the measurement of the heat flow or heat generation Q from the heat source 2 and the temperatures $T_d$ and $T_u$ at the upstream and downstream ends of the heat source 2 will give the water flow rate F in the stem 1. Further, the measurement of the heat generation Q and the temperature difference $(T_u - T_d)$ can be effected on a real time basis, so that the water flow rate F in the stem can be measured in an on-line real time fashion.

EXAMPLE

FIG. 2 schematically shows a perspective view of an arrangement of sensors in a device for measuring water flow rate in plant stem according to the invention. A plant stem 10 whose water flow rate is to be measured has a main heater 11 mounted thereon, which heater 11 surrounds the outer circumference of the stem 10 at a certain portion thereof. The main heater 11 comprises a planar heater that is made by densely winding insulated manganin wire (0.1 mm dia. with silk insulation) on a 0.02 mm thick copper foil and applying silicone rubber thereto so as to solidify the manganin wire layer. The inventors have noted that the temperature variation of the electric resistance of manganin wire is extremely small. The width of the main heater 11 in the length direction of the stem 11 is comparable with the diameter of the stem 10. A 2 mm thick plastic tape 12 is wound on the outer surface of the main heater 11, and the plastic tape layer is covered by a heat-insulating material layer 13.

To homogenize the surface temperature of both the main heater 11 and the layer of plastic tape 12, 0.02 mm thick copper foils 14 with a high heat conductivity are wound on the outer surfaces of the heater 11 and the layer of the tape 12 respectively.

Sub-heaters 15 and 16 are mounted on the stem 10 at portions downstream and upstream of the main heater 11 with spacings of 5 mm therefrom. Each of the sub-heaters 15 and 16 has substantially the same construction as that of the main heater 11, and the width of each sub-heater 15, 16 is about one-half of that of the main heater 11.

Sensors 17a and 17b of a T-type copper-constantan thermocouple 17 are mounted on the outer surfaces of the main heater 11 and the layer of the plastic tape 12 respectively, so as to detect temperature difference $(T_s - T_s')$ across two points defined by the sensors. Sensors 18a and 18b of another T-type thermocouple 18 are embedded in the stem 10 between the main heater 11 and the sub-heater 15 on the downstream side thereof. A spacing of 1.5 mm is provided between the sensors 18a and 18b in the direction of water flow in the stem 10. Thereby the temperature difference $(T_u - T_u')$ of the stem 10 on the downstream side of the main heater 11 is measured.

Sensors 19a and 19b of a still another T-type thermocouple 19 are embedded in the stem 10 between the main heater 11 and the sub-heater 16 on the upstream side thereof. Thereby the temperature difference $(T_d - T_d')$ of the stem 10 on the upstream side of the main heater 11 is measured. To measure the temperature difference $(T_u - T_d)$ of the stem 10 between upstream and downstream ends of the main heater 11, sensors 20a and 20b of another T-type thermocouple 20 are embedded in the stem 10 at the opposite ends of the main heater 11.

FIG. 3 shows a block diagram of control system of the device of the invention. The output from the thermocouple 20 which represents the temperature difference $(T_u - T_d)$ of the stem 10 between the upstream and downstream ends of the main heater 11 is applied to both a CPU 21 and a monitor 22. On the other hand, output from the thermocouple 17 which represents the temperature difference $(T_s - T_s')$ between the surface of the main heater 11 and the surface of the plastic tape 12 is connected to a control circuit 23. This control circuit 23 carries out proportional plus integral (PI) control of the main heater 11 so as to keep the temperature difference $(T_s - T_s')$ at a preset level through feedback control of power supply thereto. In the illustrated example of the invention, the above temperature difference $(T_s - T_s')$ is set at 0.2° C. More specifically, the control signal from the control circuit 23 is applied to a power regulator 24 so as to regulate the output voltage V from the power regulator 24 for controlling the power to the main heater 11. The output V from the power regulator 24 is also applied to both the CPU 21 and a monitor unit 22.

The output from the thermocouple 18 which represents the temperature $(T_u - T_u')$ between the two points on the stem 10 downstream of the main heater 11 is connected to both a control circuit 25 and the monitor unit 22. This control circuit 25 also carries out proportional plus integral (PI) control so as to keep the temperature difference $(T_u - T_u')$ at a preset level through control of power supply to the sub-heater 15. In this example, the temperature difference $(T_u - T_u')$ is set at 0° C. The control signal from the control circuit 25 is applied to a power regulator 26 so as to regulate the power supply to the sub-heater 15 for achieving $T_u - T_u' = 0$. Similarly, the output from the thermocouple 19 which represents the temperature difference $(T_d - T_d')$ between the two points on the stem 10 upstream of the main heater 11 is connected to both a control circuit 27 and the monitor unit 22. The control signal from the control circuit 27 controls the power supply from a power regulator 28 to the sub-heater 16 so as to keep the temperature difference $(T_d - T_d')$ at a preset level of 0° C.

An equation corresponding to the equation (5) is loaded in the CPU 21 beforehand. In the example of FIG. 2 and FIG. 3, the heat generation or the power at the main heater 11, is controlled, and the heat generation $Q_o$ at zero water flow in plant stem 1, i.e., F=0, is displayed as $Q_o = V_o^2/R$, R being the resistance of the main heater 11, and $V_o$ being the voltage applied to the main heater 11 at F=0 for keeping the above-mentioned temperature differences at the present levels respectively. Thus, the equation (5) can be rearranged as follows.

$$F = \frac{k(V^2 - V_o^2)}{RC_w(T_u - T_d)} \quad (6)$$

The value of heat generation $Q_o$ for zero water flow F=0 can be determined in the following manner. Under dark conditions, the transpiration of plant is very low and the water flow rate in the stem is almost zero. Thus, theoretically speaking, the value of $V_o$ corresponds to the level of V under dark conditions. In practice, however, it has been found that, due to heat loss from the main heater to members adjacent thereto through heat conduction, the value of $V_o$ corresponds to about 95% of the value of V under dark conditions. In the illustrated example, 95% of the measured V under dark conditions is stored in the CPU 21 as the value of $V_o$. The accurate value of $V_o$ may be determined by cutting the stem 10 of the plant after the completion of desired measurements.

Before starting the measurement, the numerical values of the constant k, the resistance R, the specific heat $C_w$ and $V_o^2$ are loaded in the CPU 21 because such numerical values are known. The water flow rate F in the plant stem 10 is calculated by the equation (6) with measured values of the voltage V applied to the main heater 11 and the temperature difference $(T_u - T_d)$. The water flow rate F in the stem 1 thus determined may be shown on the display 29, printed by the printer 30 and stored in the memory 31.

The performance of the above-mentioned example of the measuring device of the invention was checked by measuring known water flow rates. The result is shown in FIG. 4. The check was carried out in the following manner; namely, a model of plant stem was made by using a soda glass tube with an outside diameter of 9 mm, an inside diameter of 7 mm and a heat conductivity similar to that of plant stem; heaters and sensors as described above by referring to FIG. 2 were mounted on the model; water was passed through the tube of the model by using a peristaltic pump while setting the water flow rate at different levels by selecting proper gear ratio of the pump, and measuring the water flow rate in the model by the device of the invention. Various variables of the device of the invention were set five minutes after the start of the water flow through the tube, and the measurement was taken after the setting. There was good coincidence between the actual water flow rate and the measured value as shown in FIG. 4. Thus, it was proved that the device according to the invention can measure water flow rate in plant stem with a high accuracy.

Then, water flow rate in the stem of cucumber plant (at 10-leaf stage) was measured by the device of the invention, and the relationship between the result of such measurement value and transpiration rate measured by a weight method was checked. A metal halide lamp was used for illumination, and FIG. 5 shows the result for the case of illumination with a light intensity PPFD 20 $nEcm^{-2}S^{-1}$, and FIG. 6 shows the result for the case of illumination with a reduced light intensity PPFD 10 $nEcm^{-2}S^{-1}$ after the illumination with the light intensity PPFD 20 $nEcm^{-2}S^{-1}$. The sensors of the device of the invention were attached to the stem at a position immediately below the first node, so that the water flow rate F in the stem thus measured was considered to be a good representation of the water absorption by roots.

The electric resistance R of the main heater 11 was 93.5 Ω for both cases, and the voltage $V_o$ of the main heater 11 for zero water flow in the stem F=0 was selected to be about 95% of the value of the main heater voltage V under dark conditions. In the case of FIG. 5 $V_o$=1.05 volt, and in the case of FIG. 6 $V_o$=1.15 volt. After the light illumination, both the main heater voltage V and the stem temperature difference ($T_u-T_d$) are increased. The temperature differences ($T_s-T_s'$), ($T_u-T_u'$) and ($T_d-T_d'$) were controlled substantially at constant levels, so that it was proved that the different kinds of heat flux $q_s$, $q_u$ and the $q_d$ were kept constant. The water flow rate F in the stem, which was determined by the equation (6), increased after the light illumination with a lag relative to the increase of the transpiration velocity E, and the water flow rate F was stabilized in 20 minutes after the start of the light illumination at a level slightly higher than that of the transpiration velocity E. It was found that the water flow rate F in the stem accurately followed the reduction of illumination to 10 $nEcm^{-2}S^{-1}$ (FIG. 6) and the turning off of the illumination.

No rapid temperature rise of the stem was found in response to the heating by the heaters (maximum output of 50-100 mW), and the stem temperature was substantially constant at a level 3°-4° C. above the air temperature of 25° C. throughout the measurement. Thus, it may be safely concluded that the physiological effect of the heating by the heaters of the invention is negligible.

As described in detail in the foregoing, a device for measuring water flow rate in the stem of plant according to the invention has a high accuracy and is applicable to actual control of plant growing. In short, the invention has made it possible to measure the water flow rate in plant stem in an on-line real time fashion. More specifically, with the device of the invention, a main heater and two sub-heaters are mounted on a plant stem, and the heat flow from the main heater is varied depending on the water flow rate in the stem while keeping all other heat flows, i.e. those to the outside and to the plant stem, at constant levels, so that the water flow rate in the stem can be measured in terms of the power supply to the main heater and the stem temperature difference across the main heater, so as to facilitate accurate measurement of the stem water flow rate on the basis of on-line real time.

Although the invention has been described with a certain degree of particularly, it is understood that the present disclosure has been made only by way of example and that numerous changes in details of construction and the combination and arrangement of parts may be resorted to without departing from the scope of the invention as hereinafter claimed.

What is claimed is:

1. A device for measuring water flow rate in plant stem comprising, a heater mounted on a stem of plant so as to apply heat to the stem, a first control means for controlling heat dissipation from outer surface of the heater at a certain level, a second control means for controlling heat dissipation through the stem at a certain value, a detector for detecting quantity of heat Q generated by the heater, a temperature detecting means for measuring temperature difference of the stem between two points which points engage upstream end and downstream end of the heater with respect to water flow in the stem respectively, and a calculating means for determining water flow rate F in the stem based on the detected quantity of heat Q and the detected temperature difference.

2. A device for measuring water flow rate in plant stem as set forth in claim 1, wherein the calculating means determines the water flow rate F by an equation $$F = \frac{k(Q - Q_o)}{C_w(T_u - T_d)}$$

here, $Q_o$ is quantity of heat that is dissipated through heater outside surface and the stem, $C_w$ is specific heat of water, $T_u$ is stem temperature at a downstream end of the heater, and $T_d$ is stem temperature at an upstream end of the heater, and k is a constant.

3. A device for measuring water flow rate in plant stem as set forth in claim 1, wherein each of said first control means and second control means controls flow of heat at a constant level based on temperature difference between those two points on path of the flow of heat which are spaced in direction of the flow of heat.

4. A device for measuring water flow rate in plant stem as set forth in claim 3, wherein said second control means includes a sub-heater mounted on the stem of the plant at a point spaced from said heater and a detector of temperature difference of the stem at two points spaced in direction of heat flow.

* * * * *